United States Patent [19]
Nevin et al.

[11] Patent Number: 5,492,055
[45] Date of Patent: Feb. 20, 1996

[54] PIZZA OVEN

[75] Inventors: Ira Nevin, Eastchester; Narendra Nath, Copiaque; Faris S. Musharbash, Yonkers, all of N.Y.

[73] Assignee: Bakers Pride Oven Co., Inc., New Rochelle, N.Y.

[21] Appl. No.: 351,750

[22] Filed: Dec. 8, 1994

Related U.S. Application Data

[63] Continuation of Ser. No. 972,147, Nov. 5, 1992, abandoned.

[51] Int. Cl.⁶ .................... A21B 1/10; A21B 1/14; A21B 1/28; A21B 1/42
[52] U.S. Cl. .................... 99/331; 99/341; 126/21 R; 126/92 R
[58] Field of Search .................... 99/331, 339, 341; 126/21 R, 92 R, 273 R, 273.5

[56] References Cited

U.S. PATENT DOCUMENTS

| | | | |
|---|---|---|---|
| 2,597,627 | 5/1952 | Fader | 126/21 R |
| 2,762,362 | 9/1956 | Nielsen | 126/92 R |
| 3,042,109 | 7/1962 | Peterson | 126/92 R |
| 3,524,403 | 8/1970 | Treloar | 99/341 |
| 3,741,194 | 6/1973 | Herron | 126/21 R |
| 4,474,165 | 10/1984 | Richardson | 126/273 R |
| 4,727,799 | 3/1988 | Ohshima | 99/331 |
| 4,850,332 | 7/1989 | Sivonen | 126/273 R |
| 4,875,464 | 10/1989 | Shimek | 126/92 R |
| 4,901,705 | 2/1990 | Takata | 126/273 R |
| 4,924,763 | 5/1990 | Bingham | 99/339 |
| 4,934,260 | 6/1990 | Blevins | 99/331 |
| 4,951,648 | 8/1990 | Shukla | 99/331 |
| 4,971,023 | 11/1990 | Martinez | 126/21 R |
| 5,241,947 | 9/1993 | Sandolo | 126/273 R |

FOREIGN PATENT DOCUMENTS

| | | | |
|---|---|---|---|
| 2030119 | 5/1992 | Canada | 126/273 R |
| 2528435 | 12/1976 | Germany | 126/21 R |
| 0063324 | 5/1980 | Japan | 126/273 R |
| 59439 | 5/1947 | Netherlands | 126/273 R |
| 0783535 | 11/1980 | U.S.S.R. | 126/21 R |
| 1750561 | 7/1992 | U.S.S.R. | 126/21 R |
| 2039029 | 7/1980 | United Kingdom | 126/273 R |

*Primary Examiner*—David Scherbel
*Assistant Examiner*—Randall E. Chin
*Attorney, Agent, or Firm*—Kenneth P. Robinson

[57] ABSTRACT

An oven for pizza and other baked goods includes auxiliary heating means positioned in the baking chamber. By designing the auxiliary heater to simulate a burning log viewable through the baking chamber access door, the ambience of a wood burning oven is presented to customers. By control of activation of the auxiliary heater, faster responsiveness and improved control of baking chamber heating is achieved, resulting in improved quality control of baked goods and significantly faster baking times for increased efficiency. By provision of a front central exhaust vent, the need for an oven door is avoided.

18 Claims, 4 Drawing Sheets

PIZZA OVEN

This is a continuation of application Ser. No. 07/972,147 filed on Nov. 5, 1992, now abandoned.

BACKGROUND OF THE INVENTION

This invention relates to ovens and particularly to baking ovens suitable for preparing pizza and other baked goods.

Establishments engaged in the retail preparation and sale of pizza and other baked goods commonly utilize gas-fired ovens including a baking chamber heated from a lower combustion chamber. These ovens may be the principal fixtures in the customer service area of the establishment and are typically arranged so that the baking chamber is accessed by opening a front oven door to provide visual observation of the baking chamber interior by both the cook and the customer.

With this arrangement and usage, the customer is able to view the pizza baking in the utilitarian looking setting of the baking chamber, which is basically a plain-looking box-like enclosure above a baking surface. In addition, with the baking surface and baking chamber heating provided from the lower combustion chamber, a period of time is required for initial heating of the baking chamber for heating and browning of the upper surface of the pizza. Also, as the door is opened and additional uncooked pizza is introduced any heat loss in the baking chamber may entail a time delay as heat is replenished by burners in the combustion chamber below the baking chamber. As a result of the reliance upon heat transfer from the lower chamber, it may be necessary to extend the overall cooking time so that the baking of the lower surface portion of a pizza does not proceed faster than the heating and browning of the upper surface of the pizza. Thus, the cooking time and efficiency of long-established types of pizza ovens may be limited by the relative separation of the combustion chamber from the baking chamber. In addition, observance of a pizza, while baking, has been made unpleasant by the flow of heat out of the baking chamber of some prior ovens when the oven door is opened.

It is therefore an object of the present invention to provide new and improved baking ovens for pizza and similar products and, more particularly, to provide such ovens enabling faster baking with better quality control, more attractive customer presentation by simulation of burning wood or coals in the baking chamber, or both.

It is a further object to provide baking ovens enabling faster baking with better quality control by provision in the baking chamber of an auxiliary heat source which may be controlled separately or in conjunction with a primary heat source to provide faster heat-up and more accurate temperature control of the baking chamber.

It is an additional object to provide baking ovens with improved air flow effective to limit heat emanating from the front opening of the baking chamber and to thereby enable practical operation with an open baking chamber.

SUMMARY OF THE INVENTION

In accordance with the invention, a baking oven, including a viewable auxiliary heat source simulating burning wood or coals, has a baking chamber with a baking surface, side and rear wall sections, and a front opening. The oven includes primary heating means, positioned below the baking surface, for providing primary heating and viewable auxiliary heating means, positioned in the baking chamber and viewable through the front opening, for providing auxiliary heating of the baking chamber. The auxiliary heating means includes a radiating member arranged to radiate heat while simulating wood or coals burning in the baking chamber. Control means, coupled to the primary and auxiliary heating means, are provided for controlling operation of each of the primary and auxiliary heating means to provide desired activation of the auxiliary heating means for viewing purposes while maintaining the temperature in the baking chamber within a predetermined temperature range. Air flow means, including openings in sections of the baking chamber, are arranged for channeling air into a combustion chamber below the baking chamber, through portions of the baking chamber, and out through an exhaust vent, while limiting the flow of air out of the front opening. The oven may also have a door positionable in the front opening and including a viewing portion or window for enabling viewing of the auxiliary heating means when the door is positioned in the front opening. An exhaust vent in the upper, front central portion of the baking chamber may be included to provide an exhaust air flow which controls heat emanating from the baking chamber so as to enable practical operation without any baking chamber door.

For a better understanding of the invention, together with other and further objects, reference is made to the following description, taken in conjunction with the accompanying drawings, and its scope will be pointed out in the appended claims.

DESCRIPTION OF THE INVENTION

Figure 1:
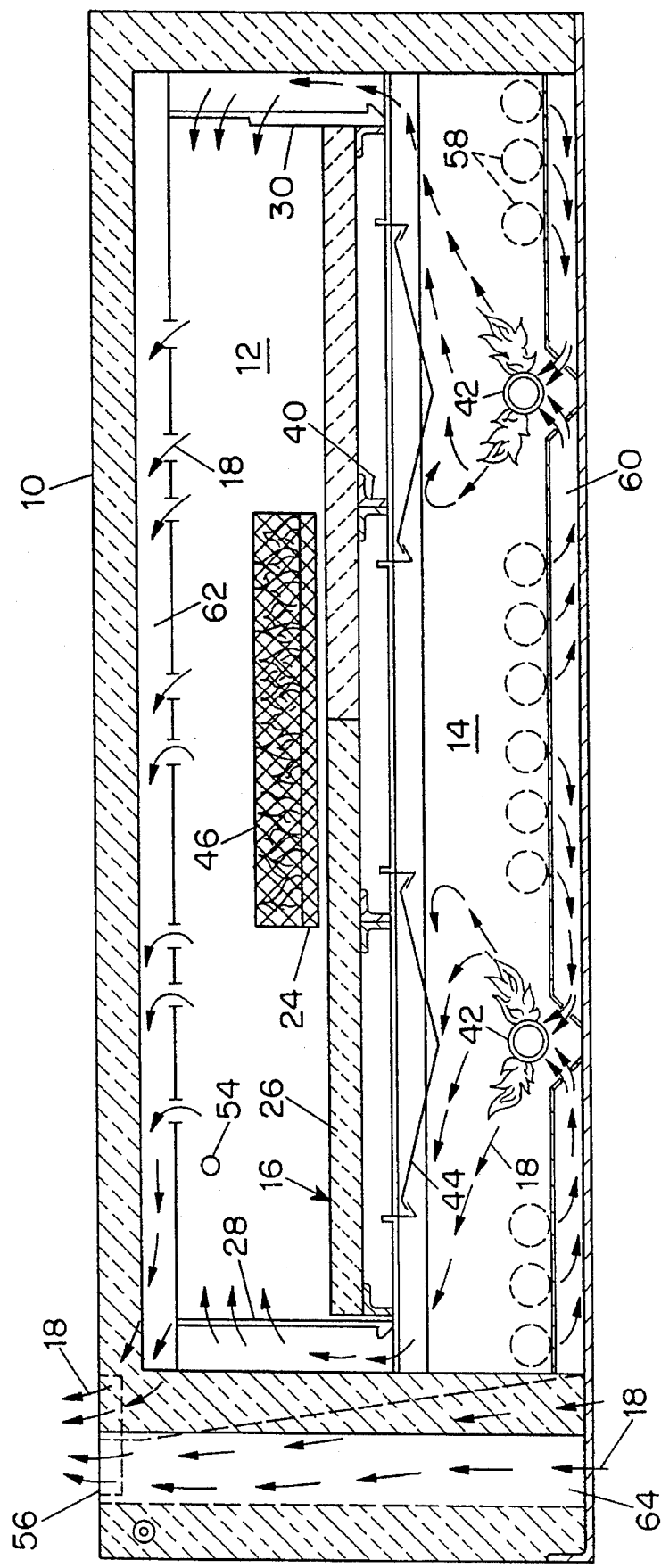
FIG. 1 is a sectional front view of a pizza oven in accordance with the invention.

FIG. 1 illustrates the basic elements of a baking oven 10 suitable for preparing pizza or other baked goods, which is constructed in accordance with the invention. This oven includes a baking chamber 12 and combustion chamber 14 positioned below a baking surface 16. The arrows, such as indicated at 18, are included to provide a basic indication of air flow through the oven. The FIG. 2 side view of the oven includes baking chamber door 20 and combustion chamber door 22, each shown in closed position. Auxiliary heating unit 24 will be addressed in greater detail below.

Figure 2:
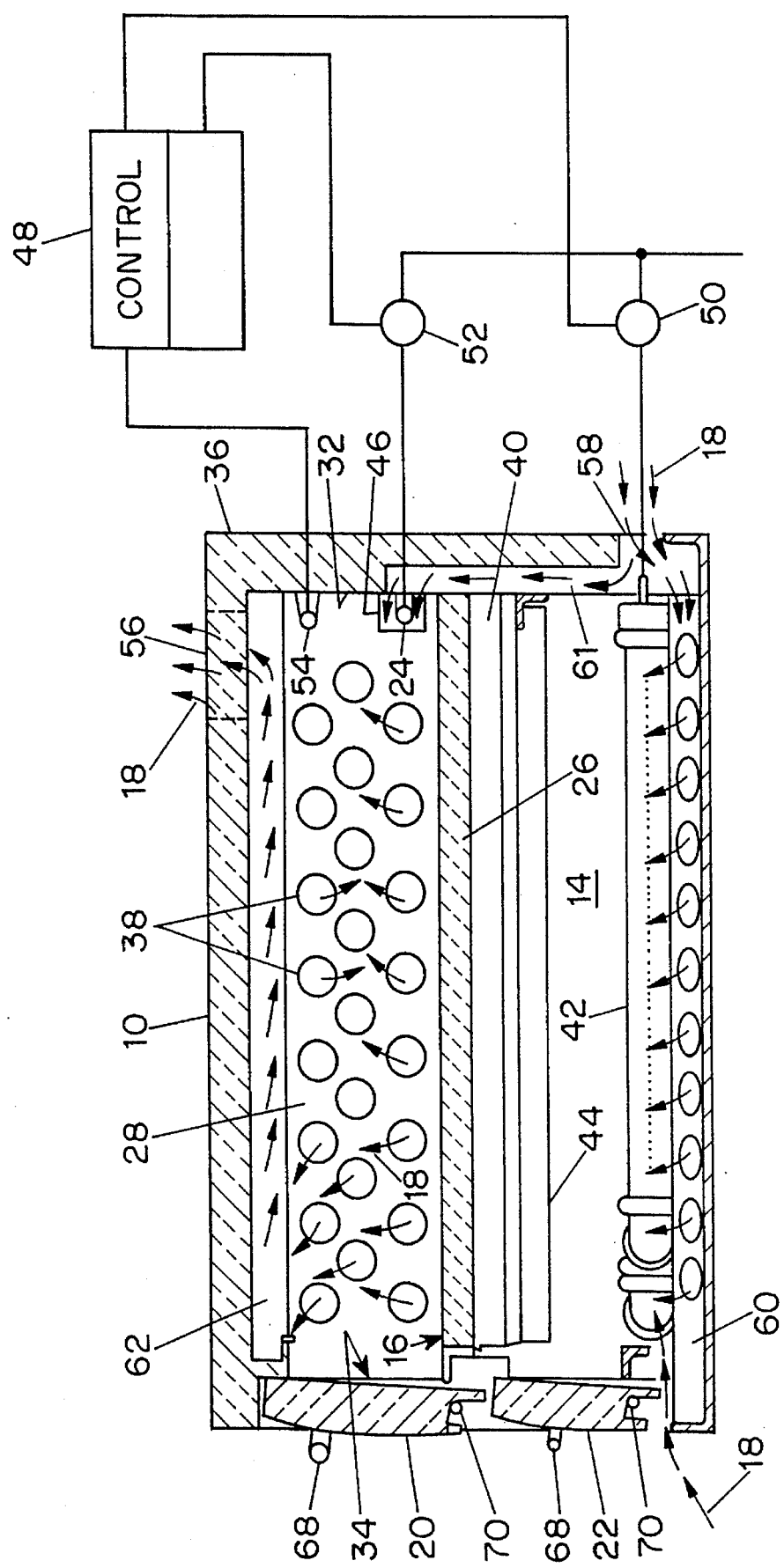
FIG. 2 is a sectional side view of the FIG. 1 oven additionally including gas control means shown schematically.

As shown in FIGS. 1 and 2, baking oven 10 includes baking chamber 12 having a baking surface 16 (shown as the upper surface of baking deck 26), side and rear wall sections 28, 30 and 32, respectively, and front opening 34. As shown, rear wall section 32 is a portion of the rear wall 36 of oven 10 and side walls 28 and 30 are sheet metal type inner walls which have holes, such as indicated at 38, to permit air passage. Baking deck 26 may be supported within the oven 10 in suitable manner at the position shown, as by the end-supported structural members 40, and may comprise cooperating sections of hard ceramic tile suitable for this purpose.

The oven of FIGS. 1 and 2 also includes primary heating means positioned in the combustion chamber 14 below the baking surface and viewable auxiliary heating means positioned in the baking chamber 12 so as to be viewable through the front opening 34 of the baking chamber. As shown, the primary heating means comprise two parallel main gas burner sections 42, mounted in the lower portion of combustion chamber 14, for providing primary heating of the baking chamber 12 both by heating of the lower surface of baking deck 26 and by flow of heated air into the baking chamber 12 through the holes in side walls 28 and 30. At 44 are shown flame diverter sections of sheet metal type construction and positioned to control and disperse direct heating of baking deck 26.

The viewable auxiliary heating means, as illustrated, includes an auxiliary gas burner 24 and an associated stainless steel grid element 46 mounted relatively close to the burner 24. As shown, the auxiliary heating means comprising burner 24 and grid 46 is mounted in the baking chamber 12, at the rear, so as to be viewable by looking into the baking chamber 12 from the front. Grid 46, which may be constructed using metallic grid, screen, wire mesh or other suitable material, is positioned so as to be readily heated to a glowing condition by auxiliary heater 24 and to thereby at least partially obscure visibility of heater 24 and gas flames emanating from burner 24. By appropriate design, the combination of the auxiliary burner 24 and grid 46 are constructed so as to suitably resemble burning wood or coals when activated, heated and viewed from a position a distance in front of the front opening 34 of the baking chamber. The design of gas burning elements so as to simulate burning wood (i.e., a log or logs) or coals (i.e., glowing portions of logs or coals) is well established. Many forms and designs of log-simulating gas burner arrangements are known in the prior art and in different applications of the invention may comprise only a suitably formed burner, or a burner plus a metal screen or other element, or some other appropriate construction to provide a general appearance of a small fire or burning wood or pile of coals. It will be appreciated that to be effective for the intended purpose, a representation of exact physical resemblance is not required and a rough simulation accommodating the viewer's imagination will generally be adequate.

The auxiliary heating means is viewably positioned in the baking chamber and enabled to perform dual functions in this embodiment. Thus, the auxiliary heating element 24 is arranged to radiate heat into the baking chamber to provide faster and more responsive heating in the baking chamber, while at the same time enhancing the attractiveness of the customer service area of the baking establishment by providing the appearance of pizza or other goods being prepared in a wood or coal burning oven.

The baking oven of FIGS. 1 and 2 also includes control means, illustrated as control unit 48, gas valve units 50 and 52, and thermostat 54, shown schematically. The control means are arranged to control operation of each of the primary and auxiliary heating means (i.e., burners 42 and 24) to provide desired activation of such heating means both for the purpose of enabling viewing of the auxiliary heating means and for the purpose of maintaining the temperature in the baking chamber within a predetermined temperature range. More particularly, it is a typical objective to approximate a desired constant temperature within a range between room temperature and a maximum temperature. For present purposes, "activation" and "activated" are defined as meaning turned on so as to generate heat.

In accordance with the invention, it will be apparent to skilled persons that by suitable arrangement of one or more temperature sensors or thermostats (as shown at 54, for example), with control unit 48 and gas valves 50 and 52, a variety of operating arrangements can be provided. Thus, an objective may be to keep the auxiliary heating means activated as continuously as possible, consistent with desired control of baking chamber temperature. Also, it may be desired to heat the baking chamber to baking temperature as quickly as possible whenever such temperature falls, as from introduction of a cold pizza. These objectives can be addressed by arranging unit 48 to maintain a low flow of gas to burner 24 at all times (unless the baking chamber is overheated) and to increase such flow of gas to burner 24 and activate burners 42 to increased operation whenever a temperature sensor in the baking chamber indicates a lower than desired temperature. Alternatively, the primary and auxiliary burners may simply be activated in unison whenever heat is required, while dispensing with or giving reduced significance to the simulation of burning wood or coals. Additional sensors may also be employed (for example, to provide information to control unit 48 regarding the temperature of baking surface 16) to enable control unit 48 to address other objectives in the operation of the oven. Thus, a sensor indicating the position of door 20 would permit control unit 48 to operate to ensure that the auxiliary burner was activated during all periods when the door was open, subject to possible overheating conditions. With the current availability of computer based control circuitry, control means such as unit 48 may be arranged to provide a wide variety of independent and dual controlled heater programs to meet desired operating objectives and may comprise a single unit or dual sections controlling the separate burners. On a simpler basis, control means such as gas valves 50 and 52 may be directly controlled by signals from one or more suitably mounted temperature sensors or thermostats, so that the control means would not include any control unit 48, as such.

In the oven of FIGS. 1 and 2, air flow means are incorporated in the form of suitable openings for channeling air into the combustion chamber 14, through portions of the baking chamber 12 (i.e., via the holes in wall sections 28 and 30), and out through an exhaust port 56. As shown, the air flow means also comprise an air intake 58, feeding a lower duct 60 having holes through which air reaches the burners 42 and an upper duct 62 through which air from the baking chamber is channeled to exhaust vent 56. An additional air passage 61, shown in FIG. 2 rising above air intake 58 within rear wall 36, provides combustion air to auxiliary burner 24 via holes behind burner 24 which resemble holes 38, but are not visible in the FIG. 1 view. As shown at the left of FIG. 1, a vertical duct 64 permits ambient air to mix with the hot exhaust air so to reduce the temperature of the exhaust air coming out of vent 56. With this arrangement, the primary burners are able to heat both the baking deck 26 and the baking chamber 12 in a manner similar to prior art ovens. At the same time, the combination including burner 24 enables several aspects of improved operation in accordance with the invention. As a result of the air flow channels and openings and the effects of convection of heated air, air flow through the baking oven 10 is effective to cause exhaust air to primarily be removed from the oven via exhaust vent 56, while limiting the flow of air out of front opening 34 even when door 20 is in an open position.

Figure 3:
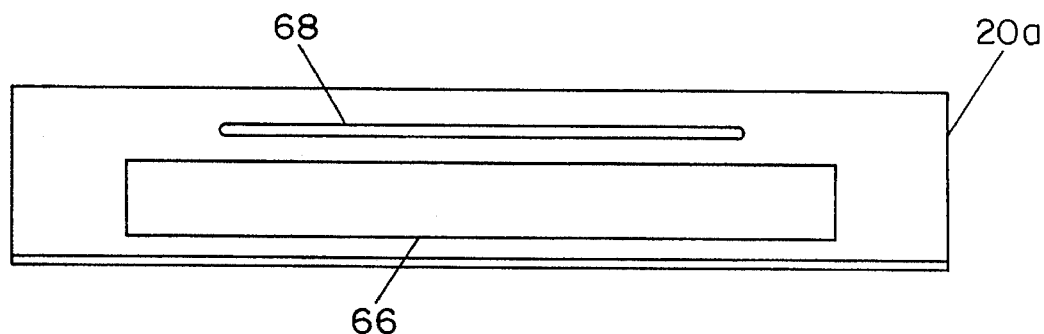
FIG. 3 is a front view of an oven door including a viewing window.

As shown in FIG. 3, door 20a may be provided with a central opening 66 which is left open or fitted with a glass window. Lower door 22 provides access to the combustion chamber 14 and is normally left in its closed position. Each door has a suitable handle 68 and, as shown, may be designed to be held in either the open or closed position as its center of gravity is moved to either side of axis 70.

Figure 4:
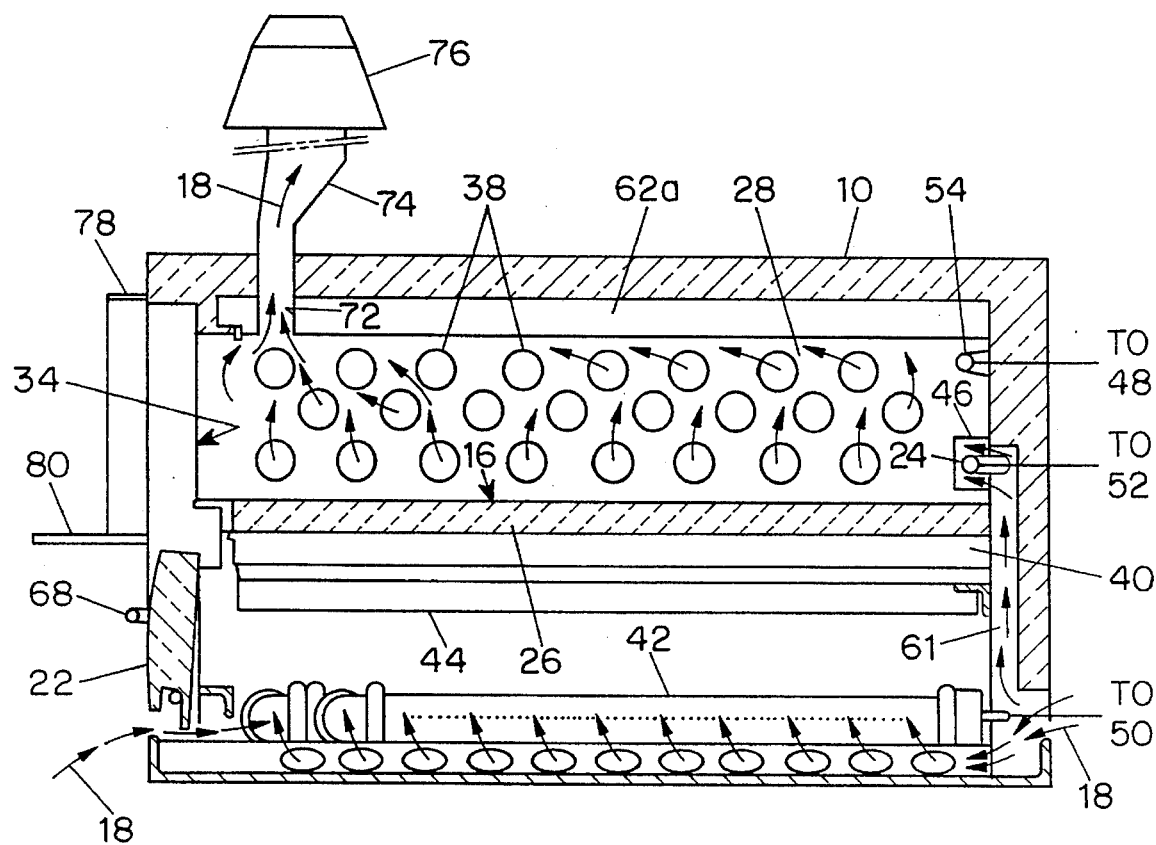
FIG. 4 is a sectional side view of a second pizza oven in accordance with the invention.
Figure 5:
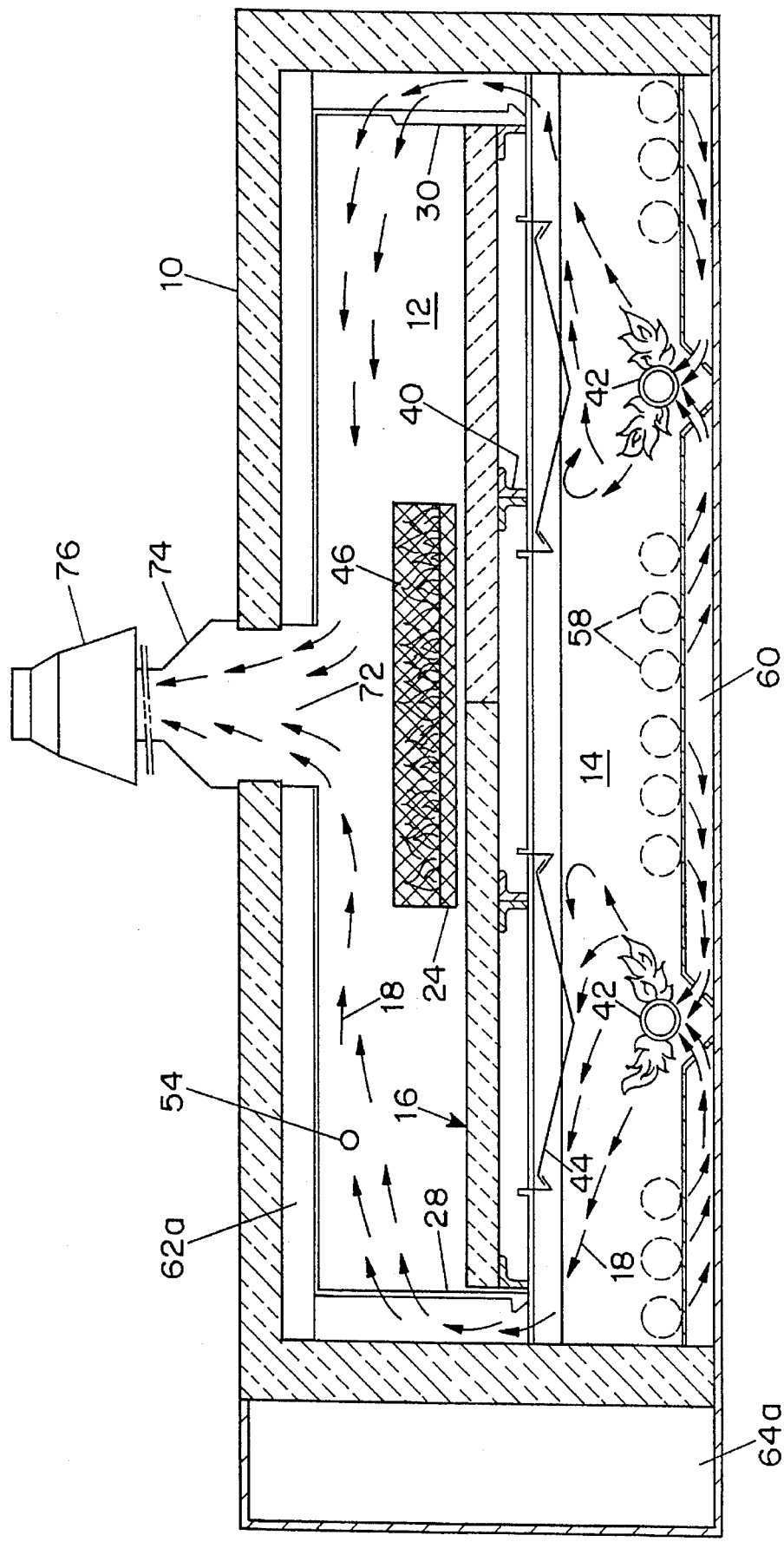
FIG. 5 is a sectional front view of the FIG. 4 oven.

Referring now to FIGS. 4 and 5 there are shown sectional side and front views of a second form of baking oven in accordance with the invention. Many of the elements of this second oven are as shown in the oven of FIGS. 1 and 2 and bear corresponding reference numerals. A distinguishing feature of the oven shown in FIGS. 4 and 5 is the provision of a rectangular exhaust vent 72 centered at the front of the top of the baking chamber 12. As illustrated, vent 72 provides access to an exhaust duct portion 74 which transitions from the rectangular shape of vent 72 to a circular shape permitting coupling to draft hood 76, directly or via one or more sections of standard metal exhaust pipe of circular cross-section. Draft hood 76 may be a suitable form of existing device whereby ambient room-temperature air is permitted to enter via a conical-shaped portion to mix with the hot exhaust air so as to reduce the temperature of the exhaust air.

As shown in FIG. 4, this oven is particularly suited for operation without the need for a door positionable in front opening 34 of the baking chamber 12. As will be appreciated, in the absence of any door to the baking chamber, the visibility and effect of the simulated wood or coal fire are enhanced. In this configuration, the air flow associated with hot exhaust air flowing up and out of the baking chamber via exhaust vent 72 reduces the amount of heat which would otherwise emanate from the oven via front opening 34 (arrows 18 indicate basic air flow). Applicants have found that, in operation, the flow of air at the front of the baking chamber into the vent 72 is effective to significantly reduce the level of heat coming out of the front of the oven.

Other differences between the oven of FIGS. 4 and 5 and the oven of FIGS. 1 and 2 include the following. As shown in FIG. 4, the open-front oven configuration is particularly suited to being faced with tile positioned around a circular or rectangular metal lip 78 framing the front opening and additional ceramic tile portions may be positioned on metal sill plate 80 to provide a non-heated extension of the baking deck 16 for both visual and food handling benefits. In FIGS. 4 and 5 the upper duct 62 of the oven of FIGS. 1 and 2 may be provided as closed upper duct 62a, which reduces heating of the upper oven surface while permitting exhaust air to flow below closed duct 62a to exhaust vent 72. Also, in FIG. 5, since vertical duct 64a at the left of the oven is not used for exhaust air flow, it may be utilized to enclose control elements and supply lines associated with the oven. With respect to air flow in an oven, it should be noted that in either embodiment of the oven as illustrated, side wall sections 28 and 30 may each comprise two contiguous sections of sheet metal, one fixed and the other movable, having similarly positioned holes 38. With this arrangement, air flow can be controlled by effectively closing off the holes in the fixed section to a desired degree by manually sliding the movable portion so that the holes in the two sections are in registration to a greater or lesser degree.

While there have been described the basic elements of the oven 10, many details of construction and operation and variations thereof will be apparent to persons skilled in the art. For example, while convection activated air flow has been described, one or more fans may be provided for forced air flow and may be activated, based on oven temperature, by control unit 48 or directly by one or more thermostat devices. Also, use of a single auxiliary heating element has been shown and described, however, in some arrangements it may be desirable to include two or more auxiliary heating elements in the baking chamber. Details on suitable choices as to dimensions and materials (such as metal, ceramic or heat resistant oven components, desired insulation and suitable design and heating capacity of gas burners) can be determined in view of particular oven applications. For example, while oven outer wall construction using inner and outer metal sheets is shown with fiberglass insulation material between the sheets, other materials and types of construction may be substituted. While the invention has been described in the particular embodiment of a gas oven, other heat sources, such as electric heating elements, may be used. In applications in which a gas or electric auxiliary heating element is intended to simulate burning wood or logs, the objective will normally be to design the element to achieve such simulation to some acceptable degree when the heating element is activated or hot, while the degree of such simulation by the element when cold or not activated will be of less significance.

In operation of ovens constructed and operated in accordance with the invention, results include:

(a) better quality consistency of the final product (i.e., better quality control through more responsive auxiliary heating of the baking chamber);

(b) faster production of high quality baked goods (i.e., in baking pizza with ovens using the invention, actual experience establishes that a product of equal or better quality can be produced in a total baking time of 5 to 6 minutes, as compared to about 8 minutes in similar ovens not incorporating the invention);

(c) improved ambience in the customer service area of a retail pizza establishment (i.e., the appearance of pizza being baked in a wood-fired oven provides a pleasing, satisfying and more inviting atmosphere for the customer); and (d) improved cooking and observing conditions (i.e., heat flow experienced by a cook or observer is reduced as a result of exhaust air flow at the baking chamber front opening).

The presently preferred embodiments of the invention have been described, however, those skilled in the art will recognize that other and further modifications and variations may be made without departing from the invention and it is intended to claim all such modifications and variations as fall within the full scope of the invention.

We claim:

1. A baking oven, including a viewable auxiliary heat source simulating burning wood or coals, comprising:

a baking chamber including a baking surface, side and rear wall sections, and a front opening;

primary heating means, positioned below said baking surface within a combustion chamber, for providing primary heating to said baking chamber;

viewable auxiliary heating means, positioned in said baking chamber and viewable through said front opening, for providing auxiliary heating to said baking chamber, said auxiliary heating means including a radiating member arranged to radiate heat while simulating wood or coals burning in said baking chamber;

control means, coupled to said primary and auxiliary heating means, for controlling operation of both of said primary and auxiliary heating means to provide desired activation of said auxiliary heating means for viewing purposes simulating burning wood or coals while also maintaining the temperature in said baking chamber within a predetermined temperature range; and air flow means for channeling air into said combustion chamber below said baking chamber, through said baking chamber, and out through an exhaust vent of said baking oven.

2. A baking oven as in claim 1, additionally comprising a door positionable in said front opening and including a viewing portion for enabling viewing of said auxiliary heating means when said door is positioned in said front opening.

3. A baking oven as in claim 2, wherein said viewing portion comprises a piece of glass.

4. A baking oven as in claim 2, wherein said viewing portion comprises an opening in a door constructed of metal.

5. A baking oven as in claim 1, wherein said radiating member comprises a gas burner element extending at least partially across side rear wall section of said baking chamber.

6. A baking oven as in claim 1, wherein said radiating member comprises a stainless steel grid and a gas burner element extending at least partially across said rear wall section of said baking chamber.

7. A baking oven as in claim 1, wherein said control means controls operation of said auxiliary heating means to cause said auxiliary heating means to be activated for extended periods during operation of said baking oven, while baking chamber heating is achieved primarily by control of activation of said primary heating means by said control means.

8. A baking oven as in claim 7, wherein said control means causes said auxiliary heating means to be activated at different temperatures levels during operation of said baking oven.

9. A baking oven as in claim 7, wherein said control means includes thermostatically controlled gas valves arranged to independently control the flow of gas to said primary and auxiliary heating means.

10. A baking oven, adapted for viewable baking of pizza or similar baked goods, comprising:

a baking chamber including a baking surface, a top, a back, a front and a front opening;

primary heating means, positioned below said baking surface, for providing primary heating to said baking chamber;

auxiliary heating means, positioned in said baking chamber, for providing faster start-up heating and improved control of operating heating to said baking chamber;

control means, coupled to said primary and auxiliary heating means and including means responsive to the temperature in said baking chamber, for controlling operation of each of said primary and auxiliary heating means to maintain the temperature in said baking chamber within a predetermined temperature range; and airflow means, including an exhaust vent near the front of the top of said baking chamber, for exhausting air from the front of said baking chamber so as to reduce the amount of heat which would otherwise leave said baking chamber via said front opening in the absence of a door positioned at said front opening.

11. A baking oven as in claim 10, wherein said auxiliary heating means comprises a gas burner element extending at least partially across the back of said baking chamber and configured to simulate wood or coals burning in said baking chamber.

12. A baking oven as in claim 11, wherein said control means controls operation of said auxiliary heating means to cause said auxiliary heating means to be activated for extended periods during operation of said baking oven, while baking chamber heating is achieved primarily by control of activation of said primary heating means by said control means.

13. A baking oven, adapted for baking pizza or similar baked goods, comprising:

a baking chamber including a baking surface and a front opening;

primary heating means, positioned below said baking surface, for providing primary heating to said baking chamber;

auxiliary heating means, positioned in said baking chamber, for providing faster start-up heating and improved control of operating heating to said baking chamber; and control means, coupled to said primary and auxiliary heating means and including means responsive to the temperature in said baking chamber, for controlling operation of each of said primary and auxiliary heating means to maintain the temperature in said baking chamber within a predetermined temperature range;

said auxiliary heating means comprising a gas burner element and a stainless steel grid positioned in said baking chamber for viewing through said front opening and designed to simulate burning wood or coals when activated.

14. A baking oven as in claim 13, wherein said control means controls operation of said auxiliary heating means to cause said stainless steel grid to radiate heat for extended periods during operation of said baking oven.

15. A baking oven, adapted for baking pizza or similar baked goods, comprising:

a baking chamber including a baking surface and a front opening;

primary heating means, positioned below said baking surface, for providing primary heating to said baking chamber;

auxiliary heating means, positioned in said baking chamber, for providing faster start-up heating and improved control of operating heating to said baking chamber;

control means, coupled to said primary and auxiliary heating means and including means responsive to the temperature in said baking chamber, for controlling operation of each of said primary and auxiliary heating means to maintain the temperature in said baking chamber within a predetermined temperature range; and a combustion chamber enclosing said primary heating means below said baking chamber; an exhaust vent; and air flow means for channeling air into said combustion chamber, through portions of said baking chamber, and out through said exhaust vent, while limiting the flow of said air out of said front opening.

16. A baking oven as in claim 15, additionally comprising a door positionable in said front opening.

17. A baking oven as in claim 15, wherein said control means controls operation of said auxiliary heating means to cause said auxiliary heating means to be activated for extended periods during operation of said baking oven, while baking chamber temperature control is achieved primarily by control of activation of said primary heating means by said control means.

18. A baking oven as in claim 15, wherein said control means includes thermostatically controlled gas valves arranged to independently control the flow of gas to said primary and auxiliary heating means.

* * * * *